United States Patent [19]

Blum et al.

[11] Patent Number: 4,904,740
[45] Date of Patent: Feb. 27, 1990

[54] BINDER COMBINATIONS, A PROCESS FOR THEIR PREPARATION AND THEIR USE

[75] Inventors: Harald Blum, Wachtendonk; Josef Pedain, Cologne; Christian Wamprecht, Neuss, all of Fed. Rep. of Germany

[73] Assignee: Bayer Aktiengesellschaft, Leverkusen-Bayerwerk, Fed. Rep. of Germany

[21] Appl. No.: 277,017

[22] Filed: Nov. 28, 1988

[30] Foreign Application Priority Data

Dec. 11, 1987 [DE] Fed. Rep. of Germany ....... 3742123

[51] Int. Cl.$^4$ .................... C09D 3/727; C07D 303/12
[52] U.S. Cl. ............................. 525/327.3; 525/327.4; 525/327.6; 525/381; 525/392
[58] Field of Search ................. 525/327.3, 327.4, 381, 525/382, 327.6

[56] References Cited

U.S. PATENT DOCUMENTS 4,364,860 12/1982 Patzschke et al. ............... 525/327.3
4,650,834 3/1987 Yagishita et al. ............... 525/327.3

FOREIGN PATENT DOCUMENTS 0240083 10/1987 European Pat. Off. .

*Primary Examiner*—Joseph L. Schofer
*Assistant Examiner*—T. McDonald, Jr.
*Attorney, Agent, or Firm*—Connolly and Hutz

[57] ABSTRACT

Compositions useful as a binder in lacquers and coating compositions and which are curable by moisture contain:

(A) from 30 to 99 parts by weight of at least one copolymer of olefinically unsaturated compounds having a weight average molecular weight of from 1500 to 75,000 and containing chemically incorporated moieties capable of undergoing an addition reaction with amino groups, and (B) from 1 to 70 parts by weight of at least one organic polyamine containing blocked amino groups, wherein (i) the copolymers of component (A) contain both intramolecular carboxylic acid anhydride moieties and epoxide moieties in a chemically bound form, with the anhydride equivalent weight of the copolymers being from 393 to 9,800 and the epoxide equivalent weight of the copolymers from 568 to 14,200, and (ii) the binder composition contains from 0.2 to 8 anhydride and epoxide moieties for each blocked amino group.

7 Claims, No Drawings

BINDER COMBINATIONS, A PROCESS FOR THEIR PREPARATION AND THEIR USE

This invention relates to binder combinations capable of hardening under the influence of moisture, consisting substantially of copolymers containing anhydride and epoxy groups and compounds suitable for cross-linking with the copolymers and containing mainly amino groups in a blocked form, and to a process for the preparation of these binder combinations and their use as binders in coating compounds and sealing compounds.

BACKGROUND OF INVENTION

The use of combinations of organic compounds containing at least two intramolecular carboxylic acid anhydride groups per molecule, in particular copolymers containing succinic acid anhydride, with polyhydroxyl compounds, as binders for lacquers and coating compounds has already been disclosed in EP-A-48 128 but the idea of applying the principle of this publication to the reaction of amines with anhydrides has failed to be realized because the reaction of amines with anhydrides proceeds very rapidly even at room temperature, leading to cross-linked products with splitting up of the anhydrides. The extremely short pot life therefore obtained has hitherto prevented the joint use of polyanhydrides and polyamines in coating systems.

One possibility of a solution is indicated in DE-OS 2 853 477, where mixtures of blocked polyamines and polyanhydrides are described which have a sufficiently long working life but harden to cross-linked products on addition of water. Ketimines and aldimines obtained by the reaction of polyamines with ketones or aldehydes are described there as suitable blocked polyamines.

The polyanhydrides mentioned there include compounds containing at least two cyclic carboxylic acid anhydride groups in the molecule, in particular products obtained by the reaction of polyols with cyclic dianhydrides using a ratio of hydroxyl groups to anhydride groups of 1:2, and copolymers of an unsaturated cyclic anhydride with polyunsaturated compounds or α-olefines.

The olefinically unsaturated compounds to be used for the preparation of the copolymers are only treated in very general terms in the general description given in DE-OS 2 853 477 and in particular there is no mention of the quantitative proportions of the individual monomers required for the preparation of the copolymers. The specific disclosure given in the examples of practical embodiment is limited to copolymers of butadiene oil and maleic acid anhydride in proportions of 1:1 and to copolmers of wood oil with maleic acid anhydride. These copolymers have, however, disadvantages since their combination with bisketimines or bisaldimines would result in badly discoloured products. Moreover, coating compounds containing unsaturated oils such as butadiene oil or wood oil as binder component result in coatings which tend to brittle and are not weather resistant.

It is also clear from the concrete example given in DE-OS 2 853 477 that dimethyl formamide is used as solvent for working up the binders specifically described there and unacceptable solids contents of only about 20% are employed.

Another possibility of increasing the working life lies in the use of oxazolanes instead of amines.

Compositions of oxazolanes and polyanhydrides which can be hardened with water are known in principle from DE-OS 2 610 406, where oxazolanes are combined with polyanhydrides for water curable sealing compounds and adhesive compounds.

Polyanhydrides described there as suitable include reaction products of polyunsaturated fatty acids with maleic acid anhydride and polyanhydrides of $C_3$ to $C_6$ alkyl (meth)acrylate and maleic acid anhydride, in particular of butylacrylate and maleic acid anhydride.

The concrete examples of systems described in DE-OS 2 610 406 still require a great deal of improvement if they are to be suitable for the productions of high quality colourless lacquer films of great hardness and a good resistance to solvents and chemicals. This applies both to the systems based on copolymers of maleic acid anhydride and butyl acrylate described in the specific examples and to the systems based on reaction products of maleic acid anhydride with multi-unsaturated fatty acid esters, which results in end products which are subject to yellowing.

The use of epoxy functional compounds in combination with polyamines for lacquers and coating systems has been disclosed e.g. in EP-A-179 954 and 183 463.

The reactivity of such binder combinations is, however, not entirely satisfactory, and when they are cured at room temperature, cross-linking is insufficient or at least requires very long reaction times, even when selected catalyst systems are added.

Hardenable compositions of soluble, hydroxyl functional acrylate copolymers, compounds containing at least two cyclic anhydride groups per molecule and compounds containing at least two epoxide groups per molecule are described in DE-OS 3 534 910. Neither compounds which contain both epoxide groups and anhydride groups nor amino functional cross-linking agents are disclosed in the said publication.

Coating compositions of anhydride functional copolymers and at least difunctional epoxides with the addition of catalysts are described in EP-A-225 097. This publication also fails to describe any compounds which contain both epoxide and anhydride groups and it does not mention any amino functional cross-linking agents.

It was an object of the present invention to provide new binder combinations suitable for the preparation of high quality systems which could harden under the influence of atospheric moisture and would have a sufficiently long pot life. The coatings obtained should be clear, colourless, resistant to yellowing and solvent resistant.

This problem has been solved by providing the binder combination described below.

BRIEF DESCRIPTION OF THE INVENTION

The binder combinations according to this invention contain a component (A) consisting of copolymers which contain both anhydride and epoxide groups in a chemically incorporated form and a curing component (B) consisting of compounds containing blocked amino groups and capable of being activated under the influence of moisture.

DETAILED DESCRIPTION

The special advantage of these binder combinations is that they can be cured by a so called double cure mechanism by which the anhydride groups and epoxy groups first react with the amino functional cross-linking agents and the carboxyl groups resulting from the reaction of anhydride will amine can then react with excess epoxy groups so that the number of free carboxyl groups in the coating is reduced and high cross-linking densities can be obtained and the product is therefore able to fulfil high standards of solvent resistance and chemical resistance.

This invention relates to binder combinations curable under the influence of moisture, containing (A) from 30 to 99 parts by weight of a copolymer component consisting of at least one copolymer of olefinically unsaturated compounds having a weight average molecular weight of from 1500 to 75000 and in which groups capable of reacting with amino groups by an addition reaction are chemically incorporated, and (B) from 1 to 70 parts by weight of a polyamine component consisting of at least one organic polyamine containing blocked amino groups, characterised in that the copolymers of component (A) contain both intramolecular carboxylic acid anhydride groups and epoxide groups in a chemically bound form and the anhydride equivalent weight of the copolymers is from 392 to 9,800 and the epoxide equivalent weight of the copolymers is from 568 to 14,200 and the binder combinations contain a total of 0.2 to 8 anhydride and epoxide groups for each blocked amino group.

The invention also relates to a process for the preparation of these binder combinations, characterised in that components (A) and (B) and optionally the additional components (C), (D) and/or (E) defined below are mixed together.

Lastly, the invention relates to the use of the new binder combinations as or in coating compounds and sealing compounds which are hardenable under the influence of moisture.

Copolymer component (A) consists of at least one copolymer containing both epoxide groups and intramolecular acid anhydride groups in a copolymerised form and having a weight average molecular weight of from 1,500 to 75,000, preferably from 3,000 to 50,000, most preferably from 3,000 to 25,000. The epoxide equivalent weight (=quantity in "g" containing 1 mol of epoxide groups) is in the region of 568 to 14,200, preferably from 973 to 7,300, and the anhydride equivalent weight (=quantity in "g" containing 1 mol of anhydride groups) is from 392 to 9,800, preferably from 817 to 3,270.

The copolymers in component (A) are preferably prepared in the presence of organic solvents. Any of the solvents conventionally used in the lacquer industry which are inert towards the monomers and copolymers under the polymerisation conditions may be used as polymerisation medium.

The copolymers are preferably prepared from a monomer mixture consisting of (a) 1 to 25 parts by weight of copolymerisable monomers containing anhydride groups, (b) 1 to 25 parts by weight of copolymerisable monomers containing epoxide groups and (c) 50 to 98 parts by weight of other copolymerisable monomers corresponding to one of the following general formulae:

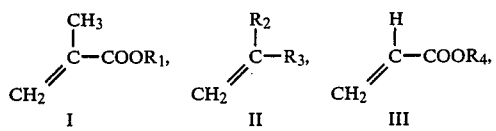

wherein $R_1$ denotes a straight chained or branched aliphatic hydrocarbon group containing 1 to 18 carbon atoms, $R_2$ denotes hydrogen or a methyl, ethyl, chloro or fluoro group, $R_3$ denotes an aromatic hydrocarbon group containing 6 to 12 carbon atoms (including aromatic groups carrying aliphatic substituents), a nitrile group, a carboxylate group containing 2 to 9 carbon atoms, an alkoxy group containing 2 to 7 carbon atoms or an amino carbonyl group in which the nitrogen atom optionally carries alkyl substituents with 1 to 6 carbon atoms which may contain ether bridges, and $R_4$ has the definition given for $R_1$ but need not be identical with $R_1$.

Itaconic acid anhydride and maleic acid anhydride are typical examples of monomers (a), maleic acid anhydride being preferred.

Glycidyl acrylate and glycidyl methacrylate are typical examples of monomers (b).

Particularly preferred monomers (c) are those corresponding to the above general formulae in which $R_1$ stands for a straight chained or branched aliphatic hydrocarbon group with 1 to 8 carbon atoms, $R_2$ stands for hydrogen or a methyl group, $R_3$ stands for an aromatic hydrocarbon group with 6 to 12 carbon atoms (including aromatic groups containing aliphatic substituents), a nitrile group, a carboxylate group with 2 to 9 carbon atoms, an alkoxy group with 2 to 7 carbon atoms or an amino carbonyl group in which the nitrogen atom optionally carries alkyl substituents with 1 to 6 carbon atoms which may contain ether bridges, and $R_4$ has the definition given for $R_1$.

Typical examples of suitable or preferred groups $R_1$ and $R_4$ include the methyl, ethyl, n-propyl, isopropyl, n-butyl, isobutyl, n-pentyl, n-hexyl, 2-ethylhexyl, n-octyl, n-decyl and n-dodecyl groups.

Hydrogen and the methyl, ethyl, chloro and fluoro groups are typical examples of suitable or preferred groups denoted by $R_2$.

Typical examples of suitable or preferred groups $R_3$ include aliphatic groups of the type defined above for $R_1$ with the exclusion of hydrogen and methyl and they also include phenyl, cyclohexyl, 2-, 3- and 4-methylphenyl, propoxy, n-butoxy, acetyl, propionyl, n-butyryl and N-methoxymethylaminocarbonyl groups.

Particularly preferred copolymer components (A) are those corresponding to the above definitions which contain (a) from 1 to 25 parts by weight, in particular from 3 to 12 parts by weight of maleic acid anhydride, (b) from 1 to 25 parts by weight, in particular from 2 to 15 parts by weight of glycidyl methacrylate, (c) from 13 to 85 parts by weight, in particular from 30 to 65 parts by weight of monomers corresponding to the formulae

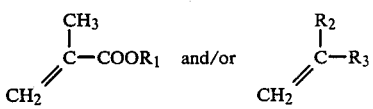

and from 10 to 65 parts by weight, in particular from 25 to 50 parts by weight of monomers corresponding to the formula

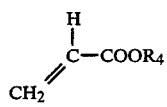

in a copolymerised form.

Particularly preferred components (A) are those copolymers corresponding to the above definition which for every 100 parts by weight of maleic acid anhydride contain from 40 to 140 parts by weight of other monomers selected from styrene, vinyl toluene, α-methylstyrene, α-ethylstyrene, isopropyl styrene, butyl styrene, methoxy styrene and diethyl styrene substituted in the nucleus, optionally in the form of isomeric mixtures, ethylvinyl ethers, n-propyl vinyl ethers, isopropyl vinyl ethers, n-butyl vinyl ethers, isobutyl vinyl ethers, vinyl acetate, vinyl propionate, vinyl butyrate and any mixtures of these monomers in a copolymerised form in addition to glycidyl methacrylate and optionally other comonomers.

Examples of suitable solvents for carrying out the copolymerisation include esters such as ethyl acetate, propyl acetate, butyl acetate, isopropyl acetate, isobutyl acetate, sec-butyl acetate, amyl acetate, hexyl acetate, benzyl acetate, ethyl propionate, butyl propionate, methylglycol acetate, ethylglycol acetate, butylglycol acetate, ethyldiglycol acetate, ethylglycol acetate, methyldiglycol acetate, butyldiglycol acetate, butyrolactone and propylene glycol methyl ether acetate, e.g. ethers such as diisopropyl ether, dibutyl ether, tetrahydrofuran, dioxane or dimethyl diglycol; hydrocarbons such as petroleum hydrocarbons, turpentile oil, solvent naphtha, terpenes, hexane, heptane, octane, cyclohexane, toluene, xylene and ethyl benzene; ketones such as acetone, methylethyl ketone, methylisobutyl ketone, methyl-n-amyl ketone, methylisoamyl ketone, diethyl ketone, ethylbutyl ketone, diisopropyl ketone, cyclohexanone, methyl cyclohexanone and isophorone or any mixtures of such and other solvents.

Copolymerisation is generally carried out with solids contents of from 30 to 95% by weight.

Part or all of the quantity of solvent is generally first introduced into the reaction vessel and the monomer mixture, initiator and, as necessary, part of the solvent are continuously added. Stirring is continued for some time after all the reactants have been added. Polymerisation is terminated after a monomer conversion of more than 96%, preferably more than 99%. It may in some cases be necessary to reactivate the reaction mixture by the subsequent addtion of a small quantity of initiator in order to obtain the desired monomer conversion. If certain monomer compositions are used as starting materials, the copolymer may contain substantial quantities of residual maleic acid anhydride monomers after polymerisation. For reasons of cost and in case these residual monomers interfere with the intended application of the end product or impair its properties, it is advantageous to reduce this residual monomer content either by distillation or by reactivation with initiator, optionally with simultaneous addition of small quantities of a monomer mixture which readily copolymerises with maleic acid anhydride, such as styrene or butyl acrylate.

As an alternative method, part of the maleic acid anhydride may be introduced into the reaction vessel together with the solvent or the maleic acid anhydride may be added dropwise more rapidly than the other monomers. These modified methods of preparation may in certain cases improve the compatibility of the components of the binder combination.

The degree of monomer conversion is ascertained by determining the solids content of the reaction mixture and by carrying out a gas chromatographic analysis of the residual monomers.

It is preferred to use the type of radical formers which are suitable for reaction temperatures of from 60° to 180° C., e.g. organic peroxides such as dibenzoyl peroxide, di-tert.-butyl peroxide, dilauryl peroxide, tert.-butyl-peroxy-2-ethylhexanoate, tert.-butyl-peroxy maleate, tert.-butyl-peroxy benzoate, dicumyl peroxide, and didecanoyl peroxide or azo compounds such as 2,2'-azo-bis-(2,4-dimethyl-valeronitrile), 2,2'-azo-bis-(isobutyronitrile), 2,2'-azo-bis-(2,3-dimethylbutyronitrile) and 1,1'-azo-bis-(1-cyclohexanenitrile).

The initiators may be used in quantities of from 0.5 to 12% by weight, based on the total quantity of monomers. Molecular weight regulating substances such as n-dodecyl mercaptan, tert.-dodecyl mercaptan, etc. may be used in quantities from 0 to 3% by weight.

The curing component (B) consists of at least one compound containing blocked amino groups which can be activated by moisture, selected from aldimine, ketimine, oxazolane, hexahydropyrimidine and tetrahydroimidazole groups, and the compound used may contain several such groups.

The blocked polyamines of component (B) have a weight average molecular weight of from 86 to 10,000, preferably from 250 to 4,000 and contain a statistical average of from 1 to 50, preferably 2 to 10, especially 2 to 4 structural units corresponding to the following general formulae:

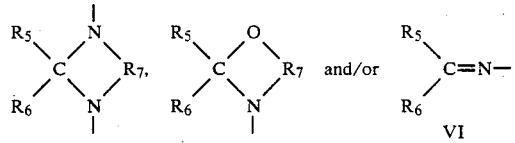

IV   V   VI wherein $R_5$ and $R_6$ may be identical or different and denote hydrogen, aliphatic hydrocarbon groups containing from 1 to 18 carbon atoms, cycloaliphatic hydrocarbon groups containing from 5 to 10 carbon atoms, araliphatic hydrocarbon groups containing from 7 to 18 carbon atoms or phenyl groups, or the two groups $R_5$ and $R_6$ together with the adjacent carbon atom may form a five membered or six membered cycloaliphatic ring, and preferably at most one of the symbols $R_5$ and $R_6$ stands for hydrogen, and $R_7$ denotes a divalent aliphatic hydrocarbon group containing 2 to 6 carbon atoms, under the condition that 2 or 3 carbon atoms are situated between the two nitrogen atoms.

The molecular weight of component (B) as well as the molecular weight of component (A) mentioned hereinbefore are determined according to the gel permeation chromatography method (molecular weights of above 1000) resp. calculated from the kind and amount of starting materials which are used for preparing said starting materials (molecular weights of below 1000).

Preferred components (B) include, for example, those containing hexahydropyrimidine or tetrahydroimidazole structures of the general formula IV in which $R_5$ and $R_6$ stand for identical or different aliphatic hydrocarbon groups with 2 to 10 carbon atoms and one of the two symbols, $R_5$ and $R_6$, may also stand for hydrogen and $R_7$ stands for an ethylene or trimethylene group.

Blocked polyamines of the type described above may be prepared in known manner by the reaction of corresponding aldehydes or ketones with the corresponding polyamines.

Suitable aldehydes or ketones for the preparation of the compounds (B) containing hexahydropyrimidine or tetrahydroimidazole groups are, for example, those corresponding to the general formula

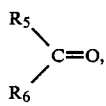

preferably having a molecular weight of from 72 to 200 (ketones) or from 58 to 250 (aldehydes).

The following are examples of these compounds: acetone, methylethyl ketone, methylpropyl ketone, methylisopropyl ketone, methyl-n-butyl ketone, methylisobutyl ketone, methyl-n-amyl ketone, methylisoamyl ketone, methylheptyl ketone, diethyl ketone, ethylbutyl ketone, ethylamyl ketone, diisopropyl ketone, diisobutyl ketone, cyclohexanone, isophorone, methyl-tert.-butyl ketone, 5-methyl-3-heptanone, 4-heptyl ketone, 1-phenyl-2-propanone, acetophenone, methylnonyl ketone, 3,3,5-trimethyl-cyclohexanone, formaldehyde, acetaldehyde, propionaldehyde, butyraldehyde, isobutyraldehyde, trimethylacetaldehyde, 2,2-dimethylpropanal, 2-ethylhexanal, 3-cyclohexene-1-carboxaldehyde, hexanal, heptanal, octanal, valeraldehyde, benzaldehyde, tetrahydrobenzaldehyde, hexahydrobenzaldehyde, acrolein, crotonaldehyde, propargylaldehyde, p-tolyl aldehyde, 2-methylpentanal, 3-methylpentanal, phenylethanal and 4-methylpentanal.

The following are preferred aldehydes and ketones for the preparation of the compounds containing hexahydropyrimidine or tetrahydroimidazole groups: butyraldehyde, isobutyraldehyde, trimethylacetaldehyde, 2,2-dimethylpropanal, 2-ethylhexanal, hexanal, 3-cyclohexane-1-carboxaldehyde, heptanal, octanal, hexahydrobenzaldehyde, 2-methylpentanal, cyclohexanone, cyclopentanone, methylisopropyl ketone, acetone, 3,3,5-trimethylcyclohexanone and methylcyclohexanone.

Mixtures of different ketones and aldehydes and mixtures of ketones with aldehydes may, of course, also be used for obtaining special properties.

The polyamines used for the preparation of the compounds containing hexahydropyrimidine or tetrahydroimidazole groups are in particular organic compounds containing at least 2 primary and/or secondary amino groups.

Suitable polyamines are, for example, those corresponding to the following general formula:

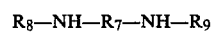

in which $R_7$ has the meaning indicated above and $R_8$ and $R_9$ may be identical or different and denote hydrogen, aliphatic hydrocarbon groups containing 1 to 10, preferably 1 to 4 carbon atoms, cycloaliphatic hydrocarbon groups containing 5 to 10, preferably 6 carbon atoms or aromatic hydrocarbon groups containing 7 to 15, preferably 7 carbon atoms, and the above mentioned hydrocarbon groups, in particular the aliphatic hydrocarbon groups, may contain heteroatoms such as oxygen, nitrogen or sulphur in the form of ether, ester, amide, urethane, oxirane, ketone, lactam, urea, thioether, thioester or lactone groups, and the groups may also contain reactive hydroxyl or amino groups.

Particularly preferred polyamines are those in which $R_8$ and $R_9$ stand for identical or different simple alkyl groups such as methyl, ethyl, n-propyl, isopropyl, n-butyl, isobutyl, tert.-butyl, n-pentyl or n-hexyl groups and at least one of the groups denoted by $R_8$ and $R_9$ is a group obtainable by the addition of an amine hydrogen atom to an olefinically unsaturated compound. Examples of olefinically unsaturated compounds suitable for the preparation of such modified polyamines include derivatives of (methyl)acrylic acid such as the esters, amides or nitriles thereof or, for example, aromatic vinyl compounds such as styrene, α-methyl styrene or vinyl toluene or, for example, vinyl esters such as vinyl acetate, vinyl propionate or vinyl butyrate or, for example, vinyl ethers such as ethylvinyl ether, propylvinyl ether, butylvinyl ether or mono- or diesters of fumaric acid, maleic acid or tetrahydrophthalic acid.

$R_8$ and/or $R_9$ also stand for an aminoalkyl or hydroxyalkyl group containing, for example, 2 to 4 carbon atoms.

Ethylene diamine, 1,2-propylene diamine, 1,3-propylene diamine, 1,2- and 1,3-butylene diamine, diethylene triamine and derivatives of these polyamines are particularly preferred polyamines.

When compounds containing oxazolane groups of the general formula V are used as component (B), they are preferably compounds in which $R_5$ and $R_6$, which may be identical or different, denote hydrogen or aliphatic hydrocarbon groups with 1 to 18, particularly 1 to 8 carbon atoms, or the groups $R_5$ and $R_6$ together with the carbon atom of the heterocyclic ring form a cycloaliphatic ring containing a total of 4 to 9 carbon atoms, in particular a cyclohexane ring, under the condition that not more than one of the symbols $R_5$ and $R_6$ stands for hydrogen, and furthermore, $R_7$ denotes an alkylene group having 2 to 4, preferably 2 or 3 carbon atoms, under the condition that at least 2 carbon atoms are situated between the oxygen and the nitrogen atom.

Components (B) containing oxazolane groups may be prepared in known manner by the reaction of the corresponding aldehydes or ketones corresponding to the following formula

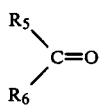

with suitable hydroxylamines of the type described hereinafter.

The aldehydes or ketones used may be selected from those already mentioned above as examples. Examples of preferred aldehydes and ketones include butyraldehyde, isobutyraldehyde, trimethyl acetaldehyde, 2,2-dimethyl propanal, 2-ethylhexanal, 3-cyclohexene-1-carboxaldehyde, hexahydrobenzaldehyde, cyclopentanone, cyclohexanone, methylcyclopentanone, methylcyclohexanone, 3,3,5-trimethylcyclohexanone, cyclobutanone, methylcyclobutanone, acetone, methylethyl ketone and methylisobutyl ketone.

Mixtures of various ketones or aldehydes or mixtures of ketones with aldehydes may, of course, also be used for obtaining special properties.

The hydroxylamines may in particular be organic compounds containing at least 1 aliphatic amino group and at least 1 aliphatically bound hydroxyl group. Although hydroxylamines containing aromatically or cycloaliphatically bound amino or hydroxyl groups may be used, they are less preferred. The hydroxylamines generally have a molecular weight of from 61 to 500, preferably from 61 to 300.

The following are examples of suitable hydroxylamines: bis-(2-hydroxyethyl)-amine, bis-(2-hydroxypropyl)-amine, bis-(2-hydroxybutyl)-amine, bis-(3-hydroxypropyl)-amine, bis-(3-hydroxyhexyl)-amine, N-(2-hydroxypropyl)-N-(2-hydroxyethyl)-amine, 2-(methylamino)-ethanol, 2-(ethylamino)-ethanol, 2-(propylamino)-ethanol, 2(butylamino)-ethanol, 2-(hexylamino)ethanol, 2-(cyclohexylamino)-ethanol, 2-amino-2-methyl-1-propanol, 2-amino-2-ethyl-1-propanol, 2-amino-2-propyl-1-propanol, 2-amino-2-methyl-1,3-propane diol, 2-amino-3methyl-3 -hydroxybutane, propanolamine and ethanolamine.

The following are particularly preferred: bis-(2-hydroxyethyl)-amine, bis-(2-hydroxypropyl)-amine, bis-(2-hydroxybutyl)-amine, bis-(3-hydroxyhexyl)-amine, 2-(methylamino)ethanol, 2-(ethylamino)-ethanol, 2-amino-2-methyl-1-propanol, 2-amino-2-ethyl-1-propanol, propanolamine and ethanolamine.

The preferred compounds containing aldimine or ketimine groups include compounds containing structural units of the following general formula VI:

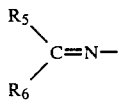

wherein

R$_5$ and R$_6$ may be identical or different and denote hydrogen or aliphatic hydrocarbon groups which have 1 to 8 carbon atoms and which may also combine with the carbon atom to form a cycloaliphatic ring, in particular a cyclohexane ring.

These compounds may in principle be prepared from the aldehydes or ketones already mentioned above as examples. Preferred aldehydes and ketones used for this purpose include butyraldehyde, isobutyraldehyde, trimethylacetaldehyde, 2,2-dimethylpropanal, 2-ethylhexanal, 3-cyclohexene-1-carboxaldehyde, hexahydrobenzaldehyde and especially those ketones which have a boiling point below 170° C. and are readily volatile at room temperature, e.g. methylisobutyl ketone, methylisopropyl ketone, diethyl ketone, diisobutyl ketone and methyl-tert.-butyl ketone.

Mixtures of different ketones or aldehydes or mixtures of ketones with aldehydes may, of course, also be used for obtaining special properties.

The polyamines used for the preparation of component (B) containing ketimine or aldimine groups may in particular be organic compounds containing at least 2 aliphatically and/or cycloaliphatically bound primary amino groups. Although polyamines containing aromatically bound amino groups may also be used, these are less preferred. The polyamines generally have a molecular weight of from 60 to 500, preferably from 88 to 400, although prepolymers with a relatively high molecular weight containing amino end groups may also be used as polyamine components for the preparation of component (B).

Diprimary aliphatic and cycloaliphatic diamines are particularly preferred polyamines, e.g. tetramethylene diamine, hexamethylene diamine, isophorone diamine, bis-(4-aminocyclohexyl)-methane, bis-aminomethylhexahydro-4,7-methanoindan, 1,4-cyclohexanediamine, 1,3-cyclohexanediamine, 2-methylcyclohexanediamine, 4-methylcyclohexanediamine, 2,2,5-trimethylhexanediamine, 2,2,4-trimethylhexanediamine, 1,4-butane diol-bis-(3-aminopropyl)-ether, 2,5-diamino-2,5-dimethylhexane, bis-aminomethylcyclohexane, bis-(4-amino-3,5-dimethylcyclohexyl)-methane or mixtures thereof.

Tetramethylene diamine, hexamethylene diamine, isophorone diamine, bis-aminomethyl-cyclohexane, 1,4-cyclohexane diamine, bis-aminomethyl-hexahydro-4,7-methanoindan and bis-(4-aminocyclohexyl)-methane are particularly preferred.

The aldimines and ketimines may be prepared not only from these preferred diamines but also from prepolymers containing primary amino end groups, i.e. compounds in the molecular weight range of from 500 to 5000, preferably from 500 to 2,000, containing at least two amino end groups. These compounds include, for example, the amino polyethers known from polyurethane chemistry, such as those described, for example, in EP-A-0 081 701 or for example, compounds containing amide, urea, urethane or secondary amino groups obtained as reaction products of difunctional or higher functional carboxylic acids, isocyanates or epoxides with diamines of the type exemplified above, which reaction products still contain at least two primary amino groups. Mixtures of such relatively high molecular weight polyamines with the low molecular weight polyamines exemplified above may also be used.

The aromatic polyamines which may in principle be used for the preparation of the aldimines or ketimines but are less preferred include, for example, 2,4- and 2,6-diamino toluene, 1,4-diamino benzene and 4,4'-diaminodiphenyl methane.

The preparation of component (B) which may contain aldimine, ketimine, oxazolane, hexahydropyrimidine or tetrahydraimidazol groups is carried out by reacting together the starting components, generally in such proportions that the amino compounds are present in a 1 to 1.5 times molar excess in relation to the carbonyl groups, depending on the particular results required of the reaction. Catalytic quantities of acid substances such as p-toluene sulphonic acid, hydrochloric acid, sulphuric acid or aluminium-III chloride or tin compounds may be added to accelerate the reaction.

The reaction is generally carried out within a temperature range of from 60° to 180° C. in the presence of an entrainer to remove the water of reaction until the calculated quantity of water has been split off or until no more water is split off. The entrainer and any unreacted starting materials still present are then removed by distillation. Toluene, xylene, cyclohexane and octane are examples of suitable entrainers. The crude products obtained may be used as component (B) for the preparation of the binder combination without further purification. If component (B) is required to be exceptionally pure, it may be obtained in a pure form by, for example, distillation.

To be included among the preferred blocked polyamines of component (B) are those containing 2 to 10 structural units of the general formula IV, V or VI and obtained by the linking together of these structural elements with the formation of, for example, ester, ether, amide, urea and/or urethane bonds.

For linking together suitable structural units of formulae IV, V, and VI, the polyamines must contain at least one primary or secondary amino group or one hydroxyl group in an unblocked form.

Suitable linking reagents for producing relatively high molecular weight components (B) include, for example, polyisocyanates, polyepoxides, polycarboxylic acids and polyacryloyl compounds.

Suitable polyisocyanates for this modification reaction include, for example, aliphatic, cycloaliphatic, araliphatic, aromatic and heterocyclic polyisocyanates such as those described e.g. by W. Siefken in Justus Liebigs Annalen der Chemie, 562, pages 75 to 136, for example: 1,4-tetramethylenediisocyanate, 1,6-hexamethylene diisocyanate, 1,12-dodecane diisocyanate, cyclobutane-1,3-diisocyanate, cyclohexane-1,3-diisocyanate, cyclohexane-1,4-diisocyanate, 1-isocyanato-3,3,5-trimethyl-5-isocyanatomethyl-cyclohexane, 2,4- and 2,6-hexahydrotolylene diisocyanate, hexahydro-1,3-and 1,4-phenylene-diisocyanate, perhydro-2,4'- and/or 4,4'-diphenylmethane diisocyanate, 1,3-phenylene diisocyanate, 1,4-phenylene diisocyanate, 2,4-tolylene diisocyanate, 2,6-tolylene diisocyanate, diphenylmethane-2,4'- and/or 4,4'-diisocyanate, naphthylene-1,5-diisocyanate, mixtures of these and other polyisocyanates, polyisocyanate containing carbodiimide groups (e.g. DE-OS 1 092 007), polyisocyanates containing allophanate groups (e.g. GB-PS 944 890), polyisocyanates containing isocyanurate groups (e.g. DE-PS 10 22 789 and DE-PS 12 22 067), polyisocyanates containing urethane groups (e.g. US-PS 33 94 164) or polyisocyanates prepared by the reaction of hydroxy compounds which are at least difunctional with excess isocyanates which are at least difunctional, polyisocyanates containing biuret groups (e.g. DE-PS 11 01 394) and prepolymers or polymeric substances containing at least two isocyanate groups.

Representatives of these compounds to be used according to the invention are described, for example, in High Polymers, volume XVI, "Polyurethanes, Chemistry and Technology", Interscience Publishers, New York, London, volume I, 1962, pages 32 to 42 and 45 and 54 and volume II, 1964, pages 5 to 6 and 198 to 199 and in Kunststoffhandbuch, volume VII, Vieweg-Hochtlen, Carl Hanser Verlag, Munich, 1966, pages 45 to 72.

Polyepoxides which have been mentioned for the aforesaid modifying reaction include, for example, aliphatic, cycloaliphatic, araliphatic, aromatic, and heterocyclic substances containing at least two epoxide groups, e.g. epoxidised esters of aliphatic polybasic acids with unsaturated monohydric alcohols, glycidyl ethers of polyhydroxyl compounds, glycidyl esters of polycarboxylic acids and copolymers containing epoxide groups.

Suitable polycarboxylic acids for the modifying reaction include, for example, aliphatic, cycloaliphatic, araliphatic, aromatic and heterocyclic substances containing at least two carboxyl groups, e.g. adipic acid, dimeric fatty acids, phthalic acid, terephthalic acid, isophthalic acid, fumaric acid, maleic acid, succinic acid, trimellitic acid, pyromellitic acid, copolymers containing (meth)acrylic acids, acid polyesters and acid polyamides.

Instead of using the acids given as examples for the modifying reaction, the corresponding acid anhydrides (provided the acids form intramolecular anhydrides) or the corresponding simple alkyl esters may be used, in particular methyl esters.

Compounds of the above mentioned type containing at least two olefinic double bonds suitable for the modifying reaction include in particular derivatives of acrylic acid and methacrylic acid such as, for example, hexane diol-bis-(meth)acrylic acid ester, trimethylol propane-tris-(meth)acrylic acid ester, pentaerythritol tetra(meth)acrylic acid ester, OH-functional polyesters and polyacrylates esterified with acrylic acid, diethylene glycol dimethacrylic acid ester, and reaction products of polyisocyanates with hydroxyalkyl (meth)acrylate.

The modifying reaction for the preparation of higher functional components (B) may also be carried out with mixtures of different block amines each containing at least one free hydroxyl or amino group capable of reacting with the modifying agent.

Polyamines containing ketimine or adlimine groups and still containing at least one free primary or secondary amino group or one free hydroxyl group may be obtained, for example, by the reaction of amines which are at least difunctional with ketones and/or aldehydes in such equivalent proportional that at least one free amino group is left over.

When using, for example, polyamines containing at least one secondary amino group in addition to primary amino groups, the reaction with aldehydes or ketones also results in aldimines or ketimines containing at least one free secondary amino group (if the reaction has been carried out with an equivalent ratio of primary amino groups to carbonyl groups of 1:1) or still containing free primary amino groups in addition to at least one secondary amino group (if the carbonyl compounds have been used in a sub-equivalent quantity, based on the primary amino groups). Examples of such primary-secondary polyamines include diethylene triamine, triethylene tetramine, tetraethylene pentamine, dipropylene triamine and tripropylene tetramine.

Compounds containing oxazolane groups and still containing at least one reactive primary or secondary amino group or a hydroxyl group may be obtained, for example, by the reaction of hydroxylamines which still contain at least one additional hydroxyl group and/or a primary or secondary amino group in addition to a hydroxyl group and a secondary amino group or by the reaction of suitable hydroxylamines containing a hydroxyl group and a primary amino group in suitable equivalent ratios with ketones and/or aldehydes such as, for example, those described above. The following are examples of suitable hydroxylamines: bis-(2-hydroxyethyl)-amine, bis-(2-hydroxypropyl)-amine, bis-(2-hydroxybutyl)-amine, bis-(3-hydroxypropyl)-amine, bis-(3-hydroxyhexyl)-amine, N-(2-hydroxypropyl)-N-(6-hydroxyhexyl)-amine, 2-amino-2-methyl-1-propanol, 2-amino-2-methyl-1,3-propane diol, 2-amino-3-methyl-3-hydroxybutane, and aminoethanol.

The hydroxylamines which contain oxazolane groups and still contain at least one free primary or secondary amino group or a hydroxyl group are prepared by the reaction of the above mentioned starting components in such an equivalent ratio of amino or hydroxyl groups to aldehyde or ketone groups that at least one primary or secondary amino group or one hydroxyl group remains unblocked and available for the subsequent reaction with the component used as modifying agent.

Compounds containing hexahydropyrimidine or tetrahydroimidazole groups and still containing at least one reactive primary or secondary amino group or a hydroxyl group are obtained, for example, by the reaction of hydroxylamines which still contain two secondary amino groups in addition to one hydroxyl group, e.g. N-methyl-N'-4-hydroxytetramethylene diamine, or by the reaction of polyamines containing at least one primary amino group or at least two further secondary amino groups in addition to one secondary amino group, e.g. N-methyl-1,3-diaminoethane, N-methyl-1,3-diaminopropane, N-methyl-1,3-diaminobutane, diethylenetriamine, N-methyl-diethylenetriamine, 3,3'-diamino-dipropylamine or N,N'-dimethylethylenetriamine.

The compounds containing hexahydropyrimidine or tetrahydroimidazole groups and still containing at least one free primary or secondary amino group or one hydroxyl group are prepared by the reaction of the above mentioned starting components in such equivalent ratios of amino or hydroxyl groups to aldehyde or ketone groups that at least one primary or secondary amino group or one hydroxyl group remains unblocked and available for the subsequent reaction with the reactant used as modifying agent.

To illustrate these compounds in more detail, the following structural units are given as suitable examples for the synthesis of such relatively high molecular weight components (B) containing ester, ether, amide, urea or urethane bonds:

bisketimine obtained from diethylenetriamine and acetone

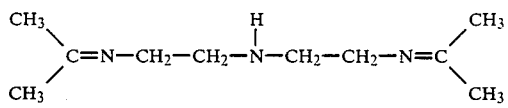

aldimine from isophoronediamine and isobutyraldehyde

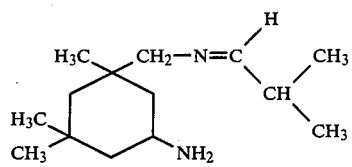

oxazolane from diethamanolamine and isobutyraldehyde

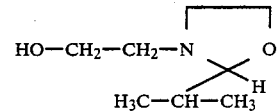

hexahydropyrimidine from N-methyl-1,3-diaminopropane and cyclohexanone

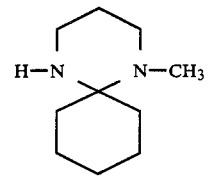

If the modifying agents exemplified above are reacted with hexahydropyrimidines or tetrahydroimidazoles containing free primary or secondary amino or hydroxyl groups, higher functional hexahydropyrimidines or tetrahydroimidazoles are obtained. The same applies to the modification of aldimines or ketimines and the modification of oxazolanes.

If, on the other hand, the modifying agents are reacted with mixtures of hexahydropyrimidines, tetrahydroimidazoles, aldimines, ketimines and/or oxazolanes containing free primary or secondary amino or hydroxyl groups, the products obtained are cross-linking components (B) in which hexahydropyrimidines, tetrahydroimidazoles, ketimines, aldimines and/or oxazolanes are chemically linked together.

A wide variety of compounds suitable for use as component (B) are therefore obtainable by these modifying or linking reactions.

The modifying reaction is normally carried out in a solvent of the type exemplified above at reaction temperatures of from 30° to 180° C., optionally in a water separator.

The reactive groups of the blocked polyamines and the reactive groups of the "modifying agent" are generally used in equivalent ratios although the "modifying agent" may be used in less than the equivalent quantity, for example in 0.75 to 0.99 times the equivalent quantity.

Compounds corresponding to the following formulae are examples of polyamines suitable as component (B) obtained by the above mentioned modifying reactions:

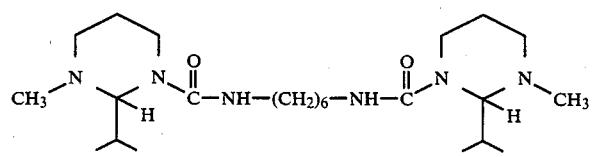

-continued

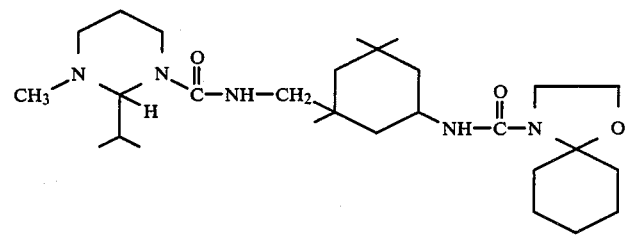

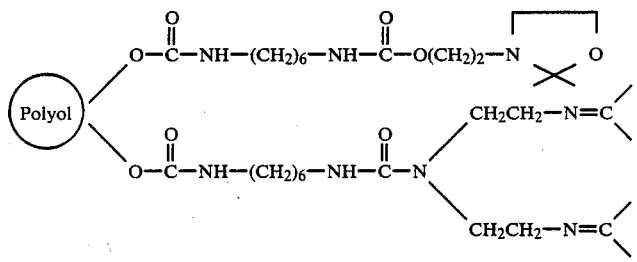

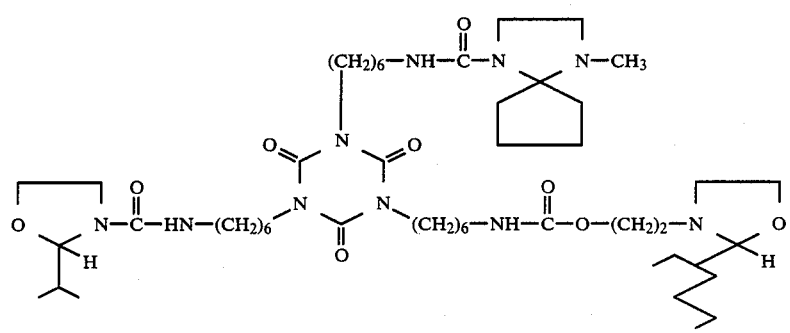

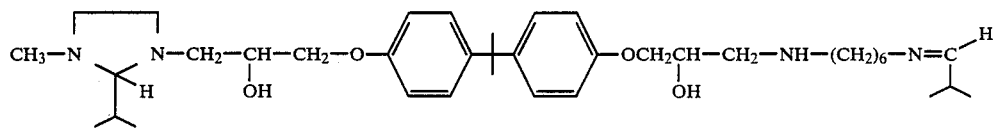

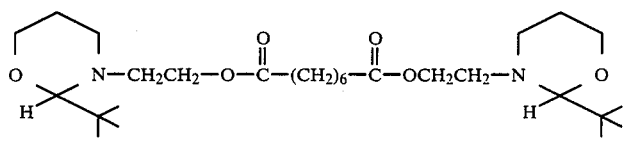

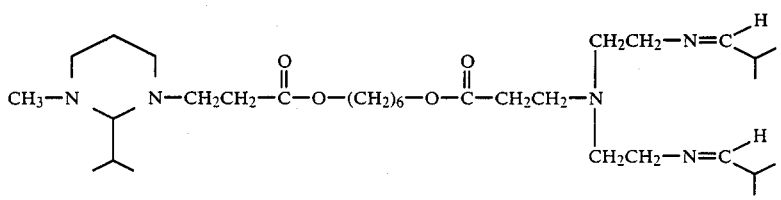

In one special embodiment, the binder combinations contain a component (C) of monohydric and/or polyhydric alcohols in quantities of from 0.1 to 20 parts by weight in addition to components (A) and (B).

The following are examples of suitable monohydric alcohols: ethanol, n-propanol, isopropanol, n-butanol, sec-butanol, tert.-butanol, n-pentanol, isopentanol, n-hexanol, isohexanol, cyclopentanol, cyclohexanol, heptanol, octanol, methylglycol, ethylglycol, propylglycol, isopropylglycol, butylglycol, methyldiglycol, ethyldiglycol, propyldiglycol, butyldiglycol, methyltriglycol, hexylglycol, propyleneglycol monomethyl ether, tripropyleneglycol monomethyl ether, dipropyleneglycol monomethyl ether, glycolic acid alkyl esters, lactic acid alkyl esters, 2-ethyl butanol, 2-ethyl hexanol, 3-methoxy butanol, diacetone alcohol, furfuryl alcohol, tetrahydrofurfuryl alcohol, caprylic alcohol, capric alcohol, lauric alcohol, myristic alcohol, palmitic alcohol, stearic alcohol, arachic alcohol, behenic alcohol, lignoceric alcohol, lauroleic alcohol, myristoleic alcohol, palmitoleic alcohol, oleyl alcohol, gadoleic alcohol, erucic alcohol, linoleic alcohol, linolenic alcohol, licanic alcohol, arachidonic alcohol, synthetic fatty alcohols and mixtures of these and/or other monohydric alcohols.

Examples of suitable polyhydric alcohols include the known copolymers of acrylic acid derivatives, methacrylic acid derivatives, aromatic vinyl compounds, vinyl ethers and vinyl esters in which hydroxyl functional monomers such as hydroxyalkyl (meth)acrylates have been incorporated by polymerisation. Such copolymers are described e.g. in EP-A-64 338, EP-A-134 691, EP-A-103 199, and EP-A-48 128.

The known hydroxyl functional polyester resins as described e.g. by H. Wagner/H. F. Sarx in Lackkunstharze, Carl-Hanser Verlag, Munich 1971, pages 86 et seq are further examples of polyhydric alcohols.

Also to be included among the polyhydric alcohols, for example, are hydroxyl functional polyether compounds such as the alkoxylation products of low molecular weight, polyhydric alcohols of the type exemplified below.

The following are further examples of suitable polyhydric alcohols: simple, polyhydric alcohols such as neopentylglycol, hexane diol, butane diol, 1,4-cyclohexane diol, 1,4-cyclohexane dimethanol, ethyleneglycol, glycerol, trimethylol propane, 1,2-propane diol, 1,3-propane triol, 1,5-pentane diol, 1,12-octadecane diol, 2-butene-1,4-diol, 2-butyne-1,4-diol, pentaerythritol, 4,4-(1-methylethylidene)-bis-cyclohexanol, bis-hydroxymethyl-hexahydro-4,7-methanol-indan and 2,2-bis-[n-(2-hydroxyethoxy)-phenyl]-propane.

Reaction products of caprolactone with the above mentioned alcohols are further examples of suitable polyhydric alcohols.

The polyhydric alcohols used may also be hydroxy functional polyaddition compounds of the type obtainable from excess quantities of polyhydroxyl compounds of the type mentioned above with organic polyisocyanates of the type mentioned above.

The binder combinations according to the invention may also contain (D) catalysts as additional components. Suitable catalysts include in particular tertiary amines in the molecular weight range of from 89 to 1000, such as 1,4-diazabicyclo-[2,2,2]-octane, triethylene diamine, triethylamine, triethanolamine, dimethylethanolamine, methyldiethanolamine, diethanolamine, diethylethanolamine, dibutylethanolamine, diethylhexanolamine, N,N,N',N'-tetramethylethylenediamine, N,N-dimethyl-1,3-propane diamine and 1,8-diazabicyclo-(5,4,0)-undec-7-ene.

Lastly, the binder combinations according to the invention may contain auxiliary agents and additives (E) such as, for example, solvents or diluents, levelling agents, antioxidants or UV absorbents.

The process according to the invention may be carried out by mixing together the starting components (A) and (B) and optionally components (C), (D) and (E). When solvents or diluents are used as component (E), they may previously be mixed with one or more of the individual components or they may be added to the mixture of components (A) to (D). According to one possible embodiment, the solvents or diluents may already be present during the preparation of one or more of the starting components as has been described above, for example, for the preparation of the copolymers. The solvents and diluents should be substantially free from water to ensure a sufficient working life for the mixtures. Solvents and diluents are generally used in the quantities required for adjusting the combinations according to the invention to suitable working viscosities. The solids content of the compositions according to the invention to be used for the purpose of the invention is generally from 20 to 90% by weight although the quantity of solvents or diluents could be even further reduced or these auxiliary agents could be completely omitted by using suitable copolymers of sufficiently low molecular weight.

In a preferred embodiment of the process according to the invention, the blocked polyamines used consist entirely of compounds (B) which are free from groups capable of reacting with anhydride groups in the absence of moisture and in which the blocked amino groups are all hexahydropyrimidine, tetrahydroimidazol, aldimine, ketimine and/or oxazolane groups of the type mentioned above. The preferred combinations according to the invention prepared in this manner contain from 40 to 90 parts by weight of copolymers (A) and from 10 to 60 parts by weight of compounds (B) which contain hexahydropyrimidine, tetrahydroimidazole, ketimine, aldimine or oxazolane groups.

The quantitative proportions of the individual components (A) and (B) are generally chosen to provide from 0.2 to 8, preferably from 0.5 to 4 epoxide and anhydride groups of component (A) for each blocked amino group of component (B). A relatively large excess of the said epoxide and anhydride groups within the given range would generally be used if the other components contain reactive groups which react with epoxide or acid anhydride groups in the absence of moisture.

These include in particular primary and secondary amino groups which may, for example, be present in component (B) in addition to the blocked amino groups, as well as alocholic hydroxyl groups which may be present in component (C) or in component (B) in addition to the blocked amino groups. Alcoholic hydroxyl groups are, however, generally substantially inert towards epoxide and acid anhydride groups under the conditions of the process according to the invention (room temperature) so that the hydroxyl groups are only taken into account if they are used in the form of relatively nonvolatile alcohols which do not evaporate when the combinations according to the invention are used and may serve as reactants for component (A), for example during the curing of coatings at elevated temperatures.

It is particularly when component (B) consists of compounds which contain free primary or secondary amino groups in addition to the blocked amino groups that the process according to the invention gives rise to complex mixtures containing amide groups (due to reaction of the acid anhydride groups with amino groups) or amino groups (due to the reaction of epoxide groups with amino groups). The term "binder combination" used in the context of this invention therefore includes both ure mixtures of the individual components (A) and (B) and optionally the other components not containing any reaction products of the individual components, and systems in which such reaction products are present in addition to the individual components or which consist mainly of such reaction products. In all variations of the process according to the invnetion it is necessary to ensure that in the event of a spontaneous reaction between acid anhydride groups and epoxide groups on the one hand and primary or secondary amino groups on the other, the molar ratio of acid anhydride and epoxide groups to blocked amino groups at the end of this reaction is in the range of 0.5:1 to 4:1, and the use of an excess of acid anhydride or epoxide groups should be considered if any of the individual components used contain alcoholic hydroxyl groups which, although substantially inert under the conditions of the process according to the invention, as already mentioned above, may react with the acid anhydride or epoxide groups along with the blocked amino groups when the products are used for the purpose of the invention.

The term "blocked polyamines (B) containing hydrogen atoms reactive with acid anhydride groups or epoxide groups" used in the context of this invention includes not only blocked polyamines of the type mentioned above which contain reactive hydrogen atoms in a chemically bound form but also those which are present as a mixture with excess polyamines or hydroxylamine used for their preparation.

In considering whether the binder combinations according to the invention are suitable for use, it is to a large extent immaterial whether a spontaneous reaction which may possibly take place between the copolymers (A) and groups which are reactive with acid anhydride or epoxide groups has already been completed or not. If desired, however, this reaction may be brought to an end before the use according to the invention by briefly heating the reaction mixture to 40°-100° C. The process according to the invention is otherwise preferably carried out at room temperature.

The process according to the invention may, of course, be carried out with any mixtures of different individual components (A) and (B) and optionally (C), (D) and (E).

The products of the process according to the invention are generally liquid at room temperature and sufficiently stable in storage in the absence of water and generally harden rapdily in the presence of atmospheric moisture after they have been applied to a substrate.

Cross-linked films are generally obtained at room temperature. This curing process, which is in any case very rapid, may be further accelerated by drying at elevated temperatures, advantageously at temperatures from 80° to 130° C. for 10 to 30 minutes.

This forced drying at elevated temperatures may be necessary for obtaining optimum properties if the blocked amino groups are exceptionally resistant to hydrolysis or if non-volatile polyhydric alcohols are included in component (C).

The lacquers and coating compounds which are to be used for the purpose according to the invention and which contain the products according to the invention as binders may contain the conventional auxiliary agents and additives of lacquer technology, such as pigments, fillers, levelling agents, antioxidants or UV absorbents.

These auxiliary agents and additives should as far as possible be free from water and are preferably incorporated with the starting components, generally with component (A), before the process according to the invention is carried out.

The lacquers and coating compounds which contain the products according to the invention as binders generally have a pot life of from 1 to 24 hours in the absence of moisture but the pot life may be increased or reduced as desired by suitable choice of the reactants. The lacquers and coating compounds may be applied to any pretreated or untreated substrate such as metal, wood, glass, ceramic, stone, concrete, plastic, textiles, leather, cardboard or paper by any of the conventional methods, e.g. by spraying, brush coating, immersion, flooding, casting or roller application.

In the following examples, the percentages and parts are based on weight unless otherwise indicated.

EXAMPLES

I. Preparation of the copolymers (A) containing anhydride and epoxide groups

General method of preparation

Part I is introduced into a 4 or 6 liter reaction vessel equipped with stirrer, condenser and heating device and heated to the reaction temperature, and part II is added after 4 hours and part III after 5 hours. After the reaction mixture has been stirred for a further hour, part IV is added and stirring is then continued for one hour and the resulting reaction mixture is optionally partly distilled. The reaction temperatures and the compositions of parts I to IV are shown in table 1, together with the solids content and viscosity of the copolymer solutions.

The equivalent weight of the anhydride and epoxide groups of the copolymer solutions were determined by calculation.

The total equivalent weight of the copolymer solution is the quantity of copolymer solution which contains 1 mol of reactive groups (i.e. anhydride and epoxide groups).

TABLE 1

| | (Quantities in g) | | | | | | | |
|---|---|---|---|---|---|---|---|---|
| | $A_1$ | $A_2$ | $A_3$ | $A_4$ | $A_5$ | $A_6$ | $A_7$ | $A_8$ |
| Part I | | | | | | | | |
| Butylacetate | 2456 | 1534 | 1531 | 1531 | 2034 | 2034 | 2034 | 2034 |
| Part II | | | | | | | | |
| MSA | 230 | 120 | 90 | 60 | 320 | 240 | 160 | 80 |
| Styrene | 276 | 180 | 90 | 90 | 320 | 160 | 120 | |
| Methyl methacrylate | 1104 | 780 | 750 | 750 | 400 | 600 | 760 | 1200 |
| Butyl acrylate | 460 | 300 | 480 | 450 | 880 | 780 | 800 | |
| Vinylacetate | | | | | | | | 80 |
| Ethylacrylate | | | | | | | | 120 |
| 2-ethyl-hexyl acrylate | | | | | | | | 400 |
| Glycidyl methacrylate | 230 | 120 | 90 | 150 | 80 | 320 | 160 | 120 |
| Part III | | | | | | | | |
| tert.-butylperoctoate[1] | 148 | 86 | 75 | 75 | 86 | 86 | 86 | 86 |
| Part IV | | | | | | | | |
| tert.-butylperoctoate[1] | 7 | | 4 | 4 | | | | |
| Reaction temperature (°C.) | 125 | 120 | 120 | 120 | 122 | 120 | 120 | 120 |
| Solids content (optionally after partial distillation) (%) | 56.0 | 50.0 | 50.0 | 50.9 | 50.1 | 49.8 | 49.6 | 49.5 |
| Viscosity (mPa.s at 23° C.) | 1390 | 893 | 450 | 481 | 673 | 558 | 268 | 560 |

TABLE 1-continued

| | (Quantities in g) | | | | | | | |
|---|---|---|---|---|---|---|---|---|
| | $A_1$ | $A_2$ | $A_3$ | $A_4$ | $A_5$ | $A_6$ | $A_7$ | $A_8$ |
| Epoxide equivalent weight of copolymer solution (g) | 2657 | 3697 | 4914 | 2893 | 7311 | 1925 | 3686 | 4927 |
| Anhydride equivalent weight (g) | 1833 | 2548 | 3390 | 4990 | 1259 | 1809 | 2552 | 5203 |
| Total equivalent weight (g) | 1038 | 1460 | 1941 | 2396 | 1108 | 865 | 1478 | 2443 |

[1] tert.-butylperoctoate is used as a 70% solution in a hydrocarbon mixture.

II. Preparation of components (B) capable of cross-linking $B_1$ 513 g of cyclohexane and 456 g of isobutyraldehyde are introduced under a nitrogen atmosphere into a 2 liter reaction vessel equipped with stirrer, condenser and heating device. 529.8 g of 1-amino-3-methyl-aminopropane are then added dropwise at 10° C. (cooling with ice bath), stirred at 10° C. for 1 hours and heated to the reflux temperature until no more water is split off. Cyclohexane and excess isobutyraldehyde are then distilled off and the hexahydropyrimidine cross-linking agent $B_1$ is obtained.

$B_2$ 200 g of 1,12-diaminododecane, 105 g of cyclohexane, 220 g of methylisobutyl ketone and 0.42 g of paratoluene sulphonic acid are weighed into a 1 liter reaction vessel equipped with stirrer, condenser and heating device under an atmosphere of nitrogen. The reaction mixture is heated to the reflux temperature until no more water separates. Excess methylisobutyl ketone and cyclohexane are then distilled off in a water jet vacuum. A bisketimine is obtained as cross-linking agent $B_2$.

$B_3$ (a) 1050 g of diethanolamine and 460 g of cyclohexane are introduced under a nitrogen atmosphere into a 3 liter reaction vessel equipped with stirrer, condenser and heating device. 792 g of isobutyraldehyde are then added at room temperature and the temperature slowly rises. The reaction mixture is kept at the reflux temperature until the separation of water has been completed, and cyclohexane and excess aldehyde are then distilled off. An oxazolane is obtained as precursor $B_3$ $(a)$.

(b) 515 g of diethylene triamine and 327 g of cyclohexane are introduced under a nitrogen atmosphere into a 2 liter reaction vessel equipped with stirrer, condenser and heating device. After the dropwise addition of 792 g of isobutyraldehyde, the reaction mixture is kept at the reflux temperature until the separation of water has been completed. Cyclohexane and excess aldehyde are distilled off and a bisaldimine is obtained as precursor $B_3$ $(b)$.

Preparation of $B_3$:

420 g of hexamethylene diisocyanate (1 mol) and 482.5 g of diethylene glycol dimethyl ether are introduced into a 2 liter reaction vessel under a nitrogen atmosphere and heated to 60° C. 441.5 g of precursor $B_3$ $(a)$ (1 mol) are then added dropwise and stirring is continued for 30 minutes at 70° C. 586 g (1 mol) of precursor $B_3$ $(b)$ are then added dropwise and stirring is continued for 6 hours at 70° C. An approximately 75% solution of cross-linking agent $B_3$ containing, on statistical average, 1 oxazolane and 2 aldimine groups is obtained.

$B_4$ 126 g of a bisepoxide (Diepoxid 126, Degussa AG) having an equivalent weight of 126 and 69.6 g of toluene are introduced into a 0.5 liter reaction vessel under a nitrogen atmosphere and heated to 50° C. 73 g of n-butylamine are then added dropwise and the reaction mixture is heated to 110° C. and stirred for 3 hours. After the reaction mixture has cooled to 50° C., 79 g of isobutyraldehyde are added dropwise and the mixture is heated at the reflux temperature until no more water is split off. An approximately 80% solution of the bisoxazolane is obtained as cross-linking agent $B_4$.

$B_5$ (a) 1348 g of hexahydrophthalic acid anhydride, 1757 g of trimethylol propane and 1673 g of a saturated fatty acid (®Prifac 9600, Unichema) are weighed into a 5 liter reaction vessel equipped with water separator, reflux condenser and heating and stirring device under a nitrogen atmosphere and heated to 220° C. for 8 hours and stirred until the acid number is ≦3.5. The polyester precursor $B_{5(a)}$ containing hydroxyl groups is obtained.

(b) 244 g of 2-aminoethanol and 140 g of cyclohexane are introduced into a 1 liter reaction vessel equipped with stirrer, condenser and heating device and 316.8 g of isobutyraldehyde are then added dropwise. Heating is continued under reflux until the separation of water has been completed. The product is then purified by distillation and the oxazolane $B_5$ $(b)$ is obtained as precursor.

Preparation of $B_5$:

200 g of the polyester precursor $B_5$ $(a)$, 41.4 g of the oxazolane $B_5$ $(b)$, 57.3 g of the oxazolane $B_3$ $(a)$ and 200 g of butyl acetate are introduced into a 1 liter reaction vessel equipped with stirrer, condenser and heating device and heated to 60° C. After the dropwise addition of 108.6 g of hexamethylene diisocyanate, stirring is continued for a further 6 hours at 60° C. The polymeric cross-linking agent $B_5$ is obtained as an approximately 65% solution.

$B_6$ 74.7 g of cross-linking agent $B_1$, 88.3 g of precursor $B_3$ $(a)$ and 247 g of butyl acetate are introduced under a nitrogen atmosphere into a 0.5 liter reaction vessel equipped with stirrer, condenser and heating device and heated to 60° C. After the dropwise addition of 84 g of hexamethylene diisocyanate, stirring is continued for 11 hours at 70° C. Cross-linking agent $B_6$ containing, on statistical average, one oxazolane and one hexahydropyrimidine, is obtained at a concentration of about 50%.

$B_7$ 200.6 g of an isocyanurate-containing polyisocyanate based on hexamethylene diisocyanate and consisting substantially of N,N',N''-tris-(6-isocyanatohexyl)-isocyanurate and 507.3 g of methoxypropyl acetate are introduced under a nitrogen atmosphere into a reaction vessel equipped with stirrer, condenser and heating device and heated to 60° C. After the dropwise addition of 286.7 g of an oxazolane prepared from 1 mol of diethanolamine and 1 mol of 2-ethylhexanal, the temperature of the reaction mixture is maintained at 70° C. for 11 hours. A 50% solution of cross-linking agent $B_7$ containing a statistical average of 3 oxazolane groups is obtained.

B$_8$ 400 g of an aliphatic polyisocyanate containing biuret groups and based on hexamethylene diisocyanate (®Desmodur N 100, Bayer AG) and 397 g of methoxypropyl acetate are introduced into a 2 liter reaction vessel equipped with stirrer, condenser and heating device. After the dropwise addition of 526.1 g of the oxazolane of diethanolamine and 2-ethylhexanal described in B$_7$, the temperature of the reaction mixture is maintained at 70° C. for 11 hours. An approximately 70% solution of cross-linking agent B$_8$ containing a statistical average of 3 oxazolane groups is obtained.

B$_9$ (a) 296 g of phthalic acid anhydride, 324 g of cyclohexane dimethanol and 52 g of neopentyl glycol are weighed into a reaction vessel suitable for esterification under a nitrogen atmosphere and heated at 220° C. for 8 hours. Water is separated until the acid number $\leq 2.5$. The polyester precursor B$_{9\,(a)}$ is obtained.

Preparation of B$_9$:

145.2 g of the polyisocyanate described under the heading of cross-linking agent B$_7$ and 113.4 g of methoxypropyl acetate are weighed into a 1 liter reaction vessel equipped with stirrer, condenser and heating device and heated to 60° C. 119.5 g of the oxazolane precursor obtained from diethanolamine and 2-ethylhexanal are then added dropwise and stirring is continued for 3 hours at 70° C. After the addition of 318.4 g of polyester precursor B$_{9\,(a)}$, the temperature continues to be maintained at 70° C. for 11 hours and cross-linking agent B$_9$ which is a polyoxazolane based on polyester is then obtained as a 70% solution.

B$_{10}$ 114 g of the polyisocyanate described with reference to the preparation of cross-linking agent B$_8$, 84.4 g of methoxypropyl acetate and 0.08 g of a catalyst based on tin (®Desmorapid SO, Bayer AG) are introduced under a nitrogen atmosphere into a 0.5 liter reaction vessel equipped with stirrer, condenser and heating device and heated to 60° C. 42.4 g of a reaction product of 2 mol of γ-caprolactone and 1 mol of bis-hydroxymethylhexahydro-4,7-methano-indan are then added dropwise and the reaction mixture is stirred for 2 hours at 60° C. 25.8 g of methoxypropyl acetate and 100.3 g of the oxazolane precursor of diethanolamine and 2-ethylhexanal are added and stirring is continued for a further 11 hours. An approximately 70% solution of a cross-linking agent B$_{10}$ containing, on statisitical average, 4 oxazolane groups is obtained.

B$_{11}$ 2069 g of methoxypropyl acetate are introduced under a nitrogen atmosphere into a 6 liter reaction vessel equipped with stirrer, condenser and heating device and heated to 140° C. A monomer mixture of 500 g of hydroxypropyl methacrylate, 700 g of methyl methacrylate and 800 g of n-butyl acrylate is added dropwise over a period of 3.5 hours, followed after 4.5 hours by 171 g of a 70% solution of tert.-butyl peroctoate in a hydrocarbon mixture, and stirring is then continued for a further 2 hours. An approximately 50% solution of an acrylate copolymer containing hydroxyl groups is obtained. 500 g of this copolymer solution, 0.2 g of a catalyst based on tin (®Desmorapid SO, Bayer AG) and 96.3 g of the oxazolane precursor B$_{3\,(a)}$ are introduced under a nitrogen atmosphere into a 1 liter reaction vessel equipped with stirrer, condenser and heating device and heated to 100° C. 84.9 g of isophorone diisocyanate are added dropwise and the reaction mixture is stirred for 6 hours. An approximately 62% solution of a copolymer-based polyoxazolane is obtained.

III. Preparation of the binder combinations according to the invention

Copolymers (A), cross-linking agents (B) and optionally components (C), (D) and (E) are mixed together at room temperature and if necessary adjusted to a suitable viscosity for processing by the addition of an organic solvent or diluent. Films are drawn on glass plates or degreased steel sheets by means of a film drawing implement to form films having a wet thickness of 150 to 180 μm. After aging, i.e. 16 to 20 hours' drying at room temperature, cross-linked films with very good mechanical properties for films are obtained. Various binder combinations were force dried at 80° C. for 30 minutes and matched off after 1 hour's cooling.

The solvent strengths given were tested by a wiping test using a wad of cottonwool soaked in acetone or super grade petrol. The results are given in the number of double strokes after which the film undergoes no visible change.

Combination K 1:

86.5 g (0.1 equivalents) of A$_6$ and 79.7 g (0.1 equivalent) of B$_7$ were mixed together, diluted to a solids content of 40% with methoxypropyl acetate and drawn out into a film on a glass plate. The film dried clear and colourless and was tack free after 45 minutes. A wipe test with acetone or super grade petrol (in each case 200 double strokes) after 16 hours' drying at room temperature showed no visible change. A water drop test also showed no visible change after 8 hours' exposure.

K 2:

110.8 g (0.1 equivalent) of A$_5$ and 71.7 g (0.09 equivalents) of B$_7$ were mixed together and diluted to a solids content of 40% with methoxypropyl acetate and drawn out into a film on a glass plate. The film dried clear and colourless and gave the same results of solvent resistance and water resistance as K 1.

K 3:

70 g (0.047 equivalents) of A$_7$ and 11.2 g (0.042 equivalents) of B$_3$ were mixed together, diluted to a solids content of 40% with methoxypropyl acetate and drawn out into a film on a glass plate. The film dried clear and colourless and was tack free and dry after 30 minutes. After 16 hours' drying at room temperature, a wipe test with super grade petrol (200 double strokes) showed no response. A water drop test showed no change after 6 hours.

K 4:

60 g (0.04 equivalents) of A$_7$ and 19 g (0.04 equivalents) of B$_6$ were mixed together, diluted to a solids content of 40% with methoxypropyl acetate and drawn out into a film on a glass plate. The film dried clear and colourless and was dry and tack free after 45 minutes. After 16 hours' drying at room temperature, a wipe test with super grade petrol (200 double strokes) showed no signs of adverse change. A water drop test resulted in slight, reversible clouding of the film after 8 hours.

K 5:

70 g (0.047 equivalents) of A$_7$ and 4.6 g (0.064 equivalents) of B$_1$ were mixed together and diluted to a solids content of 40% with methoxypropyl acetate and drawn out to form a film on a glass plate. The film dried clear and colourless and was dry and tack free after 45 minutes. A wipe test with super grade petrol showed no adverse change after 16 hours drying at room temperature (150 double strokes).

K 6:

70 g (0.047 equivalents) of $A_7$ and 9.4 g (0.051 equivalents) of $B_2$ were mixed together, diluted to a solids content of 40% with methoxypropyl acetate and drawn out to form a film on a glass plate. The film dried clear and colourless and was dry and tack free after 45 minutes. A wipe test with super grade petrol (200 double strokes) showed no signs of adverse change after 20 hours drying at room temperature and a water drop test was equally negative after 8 hours.

K 7:

86.5 g (0.1 equivalents) of $A_6$ and 114.8 g (0.1 equivalents) of $B_{11}$ were mixed together, diluted to a solids content of 40% with methoxypropyl acetate and drawn out into a film on a glass plate. The film dried clear and colourless and was dry and tack free after 60 minutes. A wipe test with acetone (150 double strokes) was negative after 16 hours drying at room temperature and a water drop test (8 hours) also failed to produce any signs of change.

K 8:

239.6 g (0.1 equivalents) of $A_4$, 28.5 g (0.05 equivalents) of $B_8$, 10.6 g (0.025 equivalents) of a hydroxy functional reaction product of 1 mol of bis-hydroxymethyl-hexahydro-4,7-methano-indan and 2 mol of caprolactone and 1.4 g of dimethyl ethanolamine were mixed together, diluted to a solids content of 40% with methoxypropyl acetate and drawn out into a film on a glass plate. The film dried clear and colourless and was dry and tack free after about 60 minutes. A wipe test with acetone (200 double strokes) produced no sign of change after 16 hours drying at room temperature and a water drop test (8 hours) was also negative.

K 9:

194.1 g (0.1 equivalents) of $A_3$ and 56.9 g (0.1 equivalents) of $B_8$ were mixed together, diluted to a solids content of 45% with methoxypropyl acetate and then to a solids content of 40% with n-pentanol and applied as a film to a degreased steel sheet. The film dried clear and colourless and was dry and tack free after about 30 minutes. A wipe test with super grade petrol (200 double strokes) produced no signs of change after 16 hours of drying at room temperature and a water drop test (8 hours) was also negative.

K 10:

244.3 g (0.1 equivalents) of $A_8$ and 68.8 g (0.08 equivalents) of $B_7$ were mixed together, diluted to a solids content of 40% with methoxypropyl acetate and then drawn out to a film on glass plate. The film dried clear and colourless and was dry and tack free after about 30 minutes. A wipe test with super grade petrol (150 double strokes) produced no signs of change after 16 hours drying at room temperature.

K 11:

103.8 g (0.1 equivalents) of $A_1$, 42.2 g (0.09 equivalents) of $B_6$ and 4.0 g of unsaturated $C_{18}$ fatty alcohol (®Ocenol110/130, Henkel) were mixed together, diluted to a solids content of 40% with methoxypropyl acetate and applied to a degreased steel sheet. After 30 minutes drying at 80° C., a clear, colourless film was obtained which showed no signs of change after a wipe test with acetone (200 double strokes) and a water drop test (8 hours).

K 12:

50 g (0.034 equivalents) of $A_7$, 31.6 g (0.036 equivalents) of $B_5$ and 0.25 g of dimethylethanolamine were mixed together. The mixture was diluted to a solids content of 40% with butyl acetate and drawn out into a film on a glass plate. The film dried to a clear, colourless and tack free finish in 60 minutes. A wipe test with super grade petrol (150 double strokes) and a water drop test (8 hours) produced no change after 16 hours drying at room temperature.

K 13:

146.6 g (0.10 equivalents) of $A_2$ and 89.9 g (0.06 equivalents) of $B_9$ were mixed together, diluted to a solids content of 40% with methoxypropyl acetate and applied to a degreased steel sheet. A clear, colourless film which withstood a wipe test with acetone (100 double strokes) as well as a water drop test (8 hours) was obtained after 30 minutes drying at 80° C.

K 14:

103.8 g (0.1 equivalents) of $A_1$ and 19.9 g (0.08 equivalents) of $B_4$ were mixed together and diluted to a solids content of 40% with methoxypropyl acetate. The film applied to a degreased steel sheet dried to a clear and colourless, tack free finish in 45 minutes. A wipe test with acetone (200 double strokes) and a water test (8 hours) produced no adverse change after 20 hours drying at room temperature.

K 15:

103.8 g (0.1 equivalents) of $A_1$ and 78.7 g (0.1 equivalents) of $B_{10}$ were mixed together and diluted to a solids content of 40% with N-methylpyrrolidone. A film applied to a degreased steel sheet was force dried at 80° C. for 30 minutes. A wipe test subsequently carried out with acetone (200 double strokes) and a water drop test (8 hours) both proceeded without producing any adverse change.

K 16:

103.8 g (0.1 equivalents) of $A_1$, 28.4 g (0.05 equivalents) of $B_8$, 15.0 g (0.01 equivalents) of $B_9$ and 1.0 g of dimethyl ethanolamine were mixed together. After dilution to a solids content of 40%, a film was applied to a degreased steel sheet and dried at 80° C. for 30 minutes. A wipe test with acetone (150 double strokes) and a water drop test (8 hours) were both negative.

K 17:

103.8 g (0.1 equivalents) of $A_1$, 28.4 g (0.05 equivalents) of $B_8$, 16.0 g of n-hexanol and 0.5 g of 1,8-diazabicyclo-(5,4,0)-undec-7-ene (DBU) were mixed together. After dilution to a solids content of 40% with methoxypropyl acetate, a film was applied to a degreased steel sheet on which it dried with a clear, colourless and tack free finish in 60 minutes. After 20 hours curing at room temperature, a wipe test with acetone (200 double strokes) and a water drop test (8 hours) produced no adverse result.

What is claimed is:

1. Moisture curable binder compositions which comprise:
   (A) from 30 to 99 parts by weight of at least one copolymer of olefinically unsaturated compounds having a weight average molecular weight of from 1500 to 75,000 and containing chemically incorporated moieties capable of undergoing an addition reaction with amino groups, and
   (B) from 1 to 70 parts by weight of at least one organic poyamine containing blocked amino groups, wherein (i) the copolymers of component (A) contain both intramolecular carboxylic acid anhydride moieties and epoxide moieties in a chemically bound form, with the anhydride equivalent weight of the copolymers being from 393 to 9,800 and the epoxide equivalent weight of the copolymers from 568 to 14,200, and (ii) the binder composition contains from 0.2 to 8 anhydride and epoxide moieties for each blocked amino group.

2. Binder compositions according to claim 1 wherein the copolymers of component (A) are copolymers obtained by radically initiated copolymerization of a monomer mixture comprising:
   (a) from 1 to 25 parts by weight of copolymerizable, anhydride-functional monomers,
   (b) from 1 to 25 parts by weight of copolymerizable, epoxide-functional monomers and
   (c) from 50 to 98 parts by weight of at least one other copolymerizable monomer corresponding to the formulae

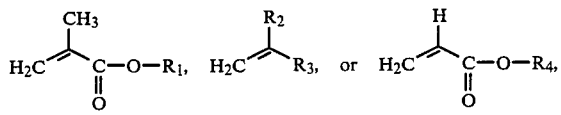

wherein
$R_1$ and $R_4$ are the same or different and each is a straight chained or branched aliphatic hydrocarbon group containing 1 to 18 carbon atoms,
$R_2$ is hydrogen, methyl, ethyl, chloro or fluoro; and
$R_3$ is aryl containing 6 to 12 carbon atoms, aralkyl containing 6 to 12 aryl carbon atoms, nitrile, carboxylate containing 2 to 9 carbon atoms, alkoxy containing 2 to 7 carbon atoms, or an aminocarbonyl in which the nitrogen is unsubstituted or substituted by alkyl with 1 to 6 carbon atoms or alkylene-alkoxy containing 2 to 6 carbon atoms.

3. Binder compositions according to claim 2 wherein the copolymers of component (A) contain maleic acid anhydride as the anhydride-functional monomer (a) in a copolymerized form.

4. Binder compositions according to claim 2 wherein the copolymers of component (A) contain glycidyl (meth)acrylate as the epoxide-functional monomer (b) in a copolymerized form.

5. Binder compositions according to claim 1 wherein component (B) contains at least one group selected from aldimine, ketimine, oxazolane, hexahydro-pyrimidine and tetrahydroimidazole.

6. Binder compositions according to claim 1 additionally containing one or more of:
   (C) monohydric or polyhydric alcohols,
   (D) catalysts, and
   (E) further auxiliary agents and additives.

7. Lacquer or coating composition which contains binder compositions according to claim 1.

* * * * *

UNITED STATES PATENT AND TRADEMARK OFFICE
CERTIFICATE OF CORRECTION

PATENT NO. : 4,904,740

DATED : February 27, 1990

INVENTOR(S) : Harald Blum; Josef Pedain; Christian Wamprecht

It is certified that error appears in the above-identified patent and that said Letters Patent is hereby corrected as shown below:

Column 26, line 68, "393" should correctly read --392--.

Signed and Sealed this

Twenty-fifth Day of August, 1992

*Attest:*

DOUGLAS B. COMER

*Attesting Officer*  Acting Commissioner of Patents and Trademarks